US 6,683,732 B2

(12) United States Patent
Maeda et al.

(10) Patent No.: US 6,683,732 B2
(45) Date of Patent: Jan. 27, 2004

(54) OBJECTIVE LENS COLLISION PREVENTING DEVICE AND METHOD FOR MANUFACTURING THE SAME

(75) Inventors: Takanori Maeda, Tsurugashima (JP); Ikuya Kikuchi, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 4 days.

(21) Appl. No.: 10/046,538

(22) Filed: Jan. 16, 2002

(65) Prior Publication Data

US 2002/0105736 A1 Aug. 8, 2002

(30) Foreign Application Priority Data

Feb. 7, 2001 (JP) ........................................ 2001-031134

(51) Int. Cl.[7] ................................................. G02B 7/02
(52) U.S. Cl. ........................................ 359/811; 359/819
(58) Field of Search ................................. 359/811, 813, 359/822, 823, 824, 819, 717, 719; 369/44.14, 44.15, 44.25, 112

(56) References Cited

U.S. PATENT DOCUMENTS 6,307,687 B1 * 10/2001 Nishikawa .................. 359/814

FOREIGN PATENT DOCUMENTS

JP 70211 A * 3/1998 ............ G02B/7/02

* cited by examiner

Primary Examiner—Ricky Mack
(74) Attorney, Agent, or Firm—McGinn & Gibb, PLLC (57) ABSTRACT

The collision preventing device is used for an optical pickup device for recording or reproducing information to or from an optical information recording medium. The collision preventing device has a shock absorbing layer to prevent a contact of an objective lens and a surface of the recording medium. The shock absorbing layer is laminated on the portion extending from the circumferential edge of the effective-diameter area of the objective lens to the outside edge or to the outside of the objective lens and has a thickness in such a manner that the shock absorbing layer comes in contact with the surface of the recording medium prior to the effective-diameter area, when the objective lens comes close to the surface of the recording medium.

29 Claims, 5 Drawing Sheets

OBJECTIVE LENS COLLISION PREVENTING DEVICE AND METHOD FOR MANUFACTURING THE SAME

BACKGROUND OF THE INVENTION

1. Field of the Invention

The present invention relates to a collision preventing device or crash pad used for an optical pickup device of an optical disk system for recording or reproducing information to or from an optical information recording medium, such as an optical disk recorded with information on the track, in order to prevent a contact of an objective lens and a surface of the recording medium. More particularly, the invention relates to the objective lens combined with a collision preventing device and a method for manufacturing the same.

2. Description of the Related Art

In recent years, optical information recording media such as optical disks are broadly used as means for recording and reproducing data such as images and sound. In a recording and reproducing apparatus, such information is recorded or reproduced to or from a track of the optical disk by the pickup device relatively moving thereto. To the optical disk system, there is a demand for further increase of density and reduction of size. In the objective lens of the pickup device, the numerical aperture for example is given 0.45 for the CD (Compact Disk) and 0.6 for the DVD (Digital Versatile Disk). Furthermore, the effective diameter of the objective lens has decreased to nearly 3 mm from nearly 4.5 mm in the conventional. As an influence of size reduction for the pickup device, the so-called working distance of between the tip end of the objective lens and the surface of the optical disk has been decreased. As compared with the conventional structure, there is increased possibility of collision of the objective lens with the optical disk surface.

In addition, the thickness of the transmissive substrate has also decreased to 0.6 mm for the DVD from 1.2 mm for the CD. Because the distance is shortened to the recording surface protected by the transmissive substrate, there is increased influence upon the signal based on the injury on the optical disk surface caused by collision of the objective lens.

Meanwhile, recently the advent of the DVD-RW (Digital Versatile-Disk-Rewritable) standard has allowed the user to make record onto the optical disk. During data recording by the user, the presence of injury on the disk surface might cause a serious affection.

Furthermore, in case that an objective lens having a large numerical aperture larger than the conventional one will be employed for the pickup device, there will be decreased the working distance of between the tip end of the objective lens and the surface of the optical disk. As a result, it is necessary to provide a collision preventing device or crash pad having accuracy higher than the conventional in dimension.

In a conventional crash pad, a resin sheet such as Teflon (trade mark) was cut out in a donut shape, and fixed with adhesive tapes to an edge of an actuator bobbin or lens barrel holding the lens. Alternatively, a resin part with a shape that is fitted with the lens barrel was formed to be used as a crash pad fitted with the lens barrel.

In using a crash pad on a two-set objective lens having a high numerical aperture actuated in an extremely short working distance, a sheet-form crash pad has a possibility of coming in contact with the optical disk, because error in the thickness of the adhering layer of the sheet, or floating thereof might occur. In a construction of a molded resin being fitted with an objective lens actuator, there is also a possibility of the crash pad coming in contact with the optical disk, unless accuracy of the molding is kept high, and adhering is done sufficiently, In either of the cases above-mentioned, the surface of the disk will be damaged unless a material softer than the surface of the disk is used. However, with soft materials, it is difficult to process into a sheet form, or to mold with high precision. It is also difficult to realize a soft crash pad high in precision that conforms to short working distance, for soft cover layers that can realize a low profile cover layer with uniform thickness.

OBJECT AND SUMMARY OF THE INVENTION

The present invention was made in view of above-mentioned respects, and an object of the present invention is to provide a collision preventing device that can reduce the collision of the effective-diameter area of the objective lens and the surface of the disk, and an objective lens combined with the same and a method for manufacturing the same.

The collision preventing device according to the present invention used for an optical pickup device for recording or reproducing information to or from an optical information recording medium is characterized by having a shock absorbing layer to prevent a contact of an objective lens and a surface of the recording medium. The shock absorbing layer is laminated on the portion extending from the circumferential edge of the effective-diameter area of the objective lens to the outside edge or to the outside of the objective lens and has a thickness in such a manner that said shock absorbing layer comes in contact with the surface of the recording medium prior to said effective-diameter area, when said objective lens comes close to the surface of the recording medium.

In one aspect of the collision preventing device according to the invention, said shock absorbing layer is made of a UV curable resin.

In another aspect of the collision preventing device according to the invention, the pickup device includes a lens barrel, and the lens barrel and said objective lens are adhered by said shock absorbing layer as an adhesive layer.

In a further aspect of the collision preventing device according to the invention, said shock absorbing layer protrudes more toward the recording medium side than an edge face of the lens barrel.

In a still further aspect of the collision preventing device according to the invention, said shock absorbing layer is composed of a laminated body including at least two shock-absorbing-material layers which have hardness numbers different from one another.

A method for manufacturing a collision preventing device used for an optical pickup device for recording or reproducing information to or from an optical information recording medium to prevent a contact of an objective lens and a surface of the recording medium, according to the present invention, is characterized by comprising the steps of:

forming a UV curable resin layer uniformly with a predetermined thickness, fixed to the lens surface of said objective lens; and exposing the lens surface within an effective-diameter area of the lens surface by removing a part of said UV curable resin layer corresponding to said effective diameter part of the lens surface.

In one aspect of the method for manufacturing a collision preventing device according to the invention, the pickup device includes a lens barrel, and the method further comprising a step of adhering said objective lens and the lens barrel, using said UV curable resin layer as an adhesive layer.

In another aspect of the method for manufacturing a collision preventing device according to the invention, said exposing step includes a step of cutting and peeling off the part of said UV curable resin layer corresponding to said effective diameter part.

In a further aspect of the method for manufacturing a collision preventing device according to the invention, said exposing step includes a step of removing the part of said UV curable resin layer corresponding to said effective diameter part by etching.

In a still further aspect of the method for manufacturing a collision preventing device according to the invention, said exposing step includes a step of pressing and cutting the part of said UV curable resin layer corresponding to said effective diameter part, using a metal mold corresponding to the effective-diameter area.

In another aspect of the method for manufacturing a collision preventing device according to the invention, said forming step of the UV curable resin layer includes a step of repeating to form at least two shock-absorbing-material layers as a laminated body which have hardness numbers different from one another.

An objective lens used for an optical pickup device for recording or reproducing information to or from an optical information recording medium to prevent a contact of an objective lens and a surface of the recording medium, according to the present invention, is characterized by comprising:

an objective lens main body having an effective-diameter area; and a shock absorbing layer laminated on a portion extending from a circumferential edge of said effective-diameter area to an outside edge or outer side surface of said objective lens and having a thickness in such a manner that, when said objective lens comes close to the surface of the recording medium, said shock absorbing layer comes in contact with the surface of the recording medium prior to said effective-diameter area.

In one aspect of the objective lens according to the invention, said shock absorbing layer is made of a UV curable resin.

In another aspect of the objective lens according to the invention, the pickup device includes a lens barrel, and the lens barrel and said objective lens are adhered by said shock absorbing layer as an adhesive layer.

In a further aspect of the objective lens according to the invention, said shock absorbing layer protrudes more toward the recording medium side than an edge face of the lens barrel In a still further aspect of the objective lens according to the invention, said shock absorbing layer is composed of a laminated body including at least two shock-absorbing-material layers which have hardness numbers different from one another.

DETAILED DESCRIPTION OF THE PREFERRED EMBODIMENTS

Embodiments of an objective lens with a collision preventing device and a method for manufacturing the same according to the present invention will be described in the following, with references to the drawings.

Figure 1:
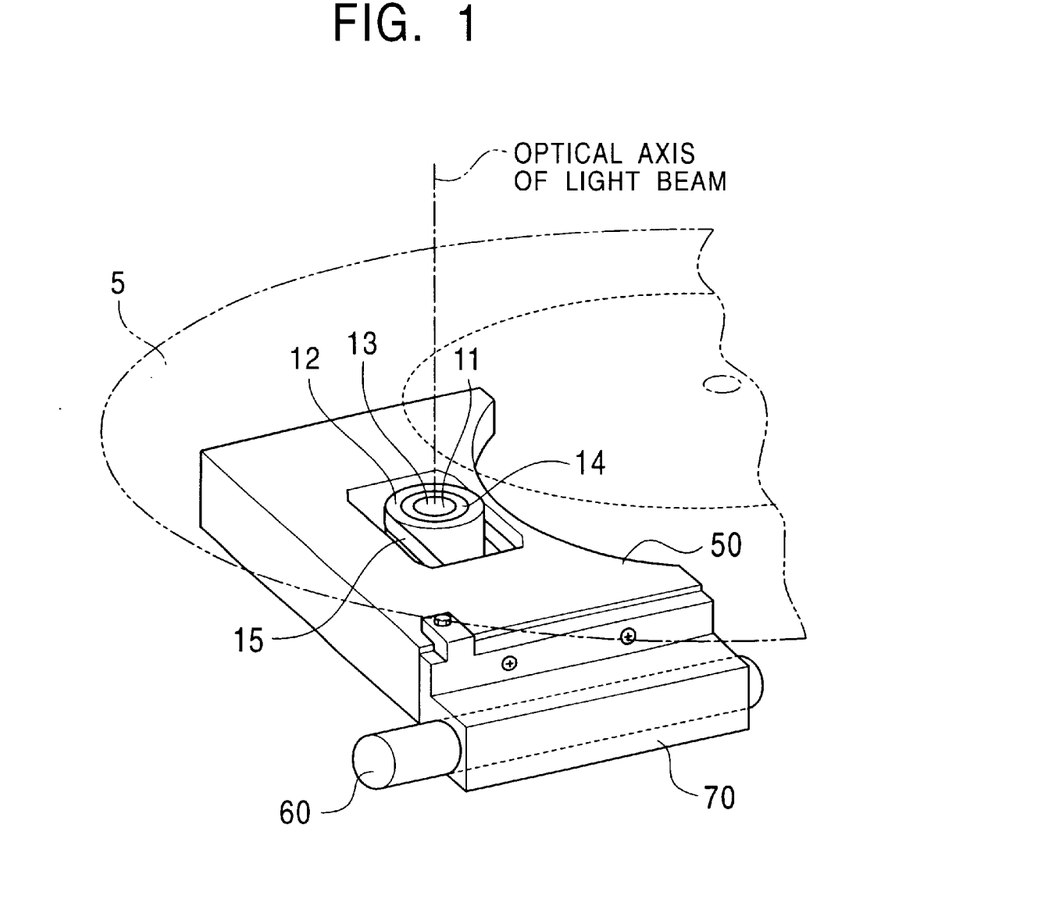
FIG. 1 is a schematic perspective view showing an optical pickup device that is mounted with an objective lens according to an embodiment of the present invention.

FIG. 1 shows a construction example of a pickup main unit 50 mounted with an objective lens, which uses an embodiment of the collision preventing device based on this invention. In FIG. 1, reference numeral 11 denotes an objective lens, reference numeral 12 denotes a lens barrel, and reference numeral 13 denotes a surface area of the objective lens effectively emitting light including an optical axis of light beam from an optical irradiating system described later (in this paper, such area is also referred merely to as "effective-diameter area"). Reference numeral 14 denotes a crash pad, reference numeral 15 denotes an objective-lens-driving part that actuates the lens barrel supporting the objective lens, and reference numeral 5 denotes an optical disk. The crash pad 14 is a shock absorbing layer, and is laminated on the portion extending from the circumferential edge of the effective-diameter area 13 to the outer edge and outer side surface of the objective lens 11. When the objective lens 11 comes near to the surface of the optical disk 5, the crash pad 14 comes in contact with the surface of the optical disk 5 prior to the effective-diameter area 13.

The crash pad 14 is formed by resin directly on the surface of the objective lens 11 in circular form, and the opening diameter of the crash pad 14 is made bigger than the effective-diameter area 13 of the lens. The material for the resin can be selected from among UV curable resins that are softer than the surface of the disk, such as EX-504 or EX-508 made by Dainippon Ink and Chemicals, Inc., or KCB-308 made by Nippon Kayaku Co., Ltd. In the present invention, a resin layer made of UV curable adhesive resin or the like is formed directly on the surface of the objective lens. This resin layer is also made into a shape having an opening, by removing the resin layer portion on top of the effective-diameter area of the objective lens. The thus resulted adhesive resin layer is made to act as a crash pad. Moreover, rubber type or cellulose type resin can also be used in place of the UV curable adhesive resin. In other words, the crash pad 14 according to the present invention is formed by using materials that are lower in hardness than the light-transmission layer on the recording surface of the optical disk 5.

Figure 2A:
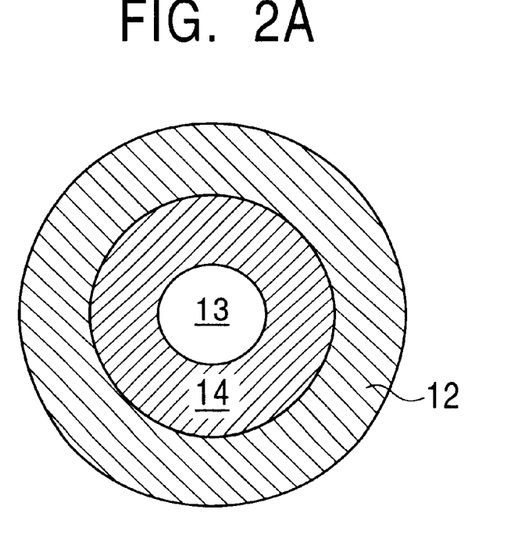
FIGS. 2A and 2B are a schematic plan view and a sectional view respectively, each showing the objective lens according to the embodiment of the present invention.
Figure 2B:
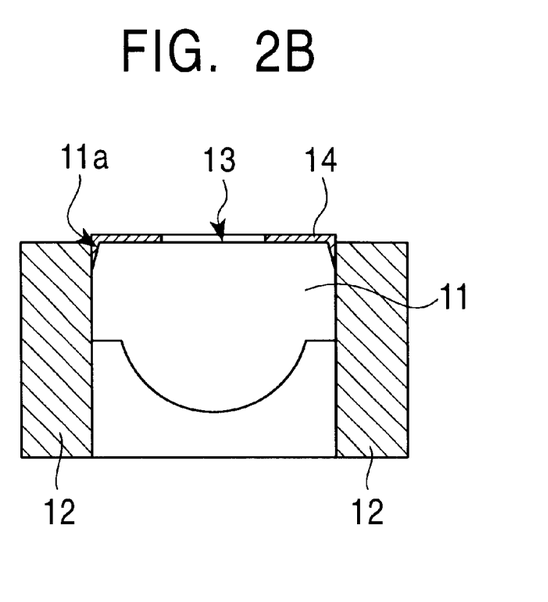

As shown in FIGS. 2A and 2B, the crash pad 14 is adhered to the inner surface of the lens barrel 12 that is supported by surrounding sides. The crash pad 14 also protrudes from the edge surface of the lens barrel 12 toward the optical disk 5 side. As a matter of course, the crash pad 14 protrudes from the effective-diameter area 13 toward the optical disk 5 side. The crash pad 14 is laminated on the portion extending from the circumferential edge of the effective-diameter area 13 to the outer edge and outer side surface 11a of the objective lens 11.

The unit 50 of the optical pickup device shown in FIG. 1 includes a light source such as a semiconductor laser that emits light beam. The unit 50 is provided with the optical irradiating system that guides the light beam to the objective lens, and an optical detecting system that includes at least one photo-detector, and guides reflected light coming from the optical disk to the photo-detector through the objective lens.

There are elastic support members like leaf springs or the like, which support the lens barrel to the main unit 50, provided around the side face of the lens barrel 12 that supports the objective lens 11. There is also an objective-lens-driving part 15 provided around the side face of the lens barrel 12, such as actuators that drive the objective lens 11 in the radial direction of the optical disk 5 and the focusing direction, to condense light beams to the information recording surface of the optical disk 5. The objective-lens-driving mechanism has a coil extending in the radial and focusing directions and a magnetic circuit (not shown), which cooperate with the lens barrel 12. The main unit 50 is fixed to a slider 70 that moves along a shaft 60 that extends in the radial direction of the optical disk 5, as shown in FIG. 1. The slider 70 enables the main unit 50 to make a coarse movement in the radial direction of the optical disk 5.

The method for manufacturing the crash pad 14 is to first form a uniform film of UV curable resin layer with a predetermined thickness, so that it is fixed to the lens surface of the objective lens 11 manufactured beforehand. Then a part of the UV curable resin layer corresponding to the effective-diameter area 13 of the lens surface is removed and the lens surface within the area is exposed.

Methods for removing the UV curable resin layer corresponding to the effective-diameter area of the objective lens 11 to form the crash pad 14 is described in the following. One method is to first form a resin layer on the whole surface beforehand, and then to cut the part at the effective-diameter area 13 off in circular form using a jig and peeling it off, or removing it using etching means. Another method is to make beforehand a metal mold for removing a part corresponding to the effective-diameter area, and then to apply this mold to the surface of the objective lens coated, and press and cut the layer of ultraviolet curing type resin.

Figure 3:
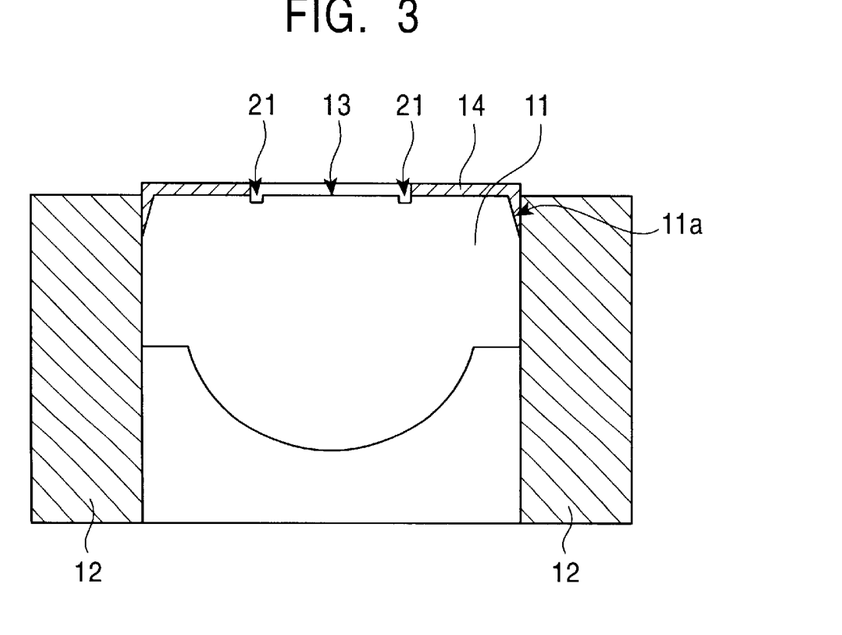
FIGS. 3 to 7 are schematic sectional views showing the objective lenses according to other embodiments of the present invention.
Figure 4:
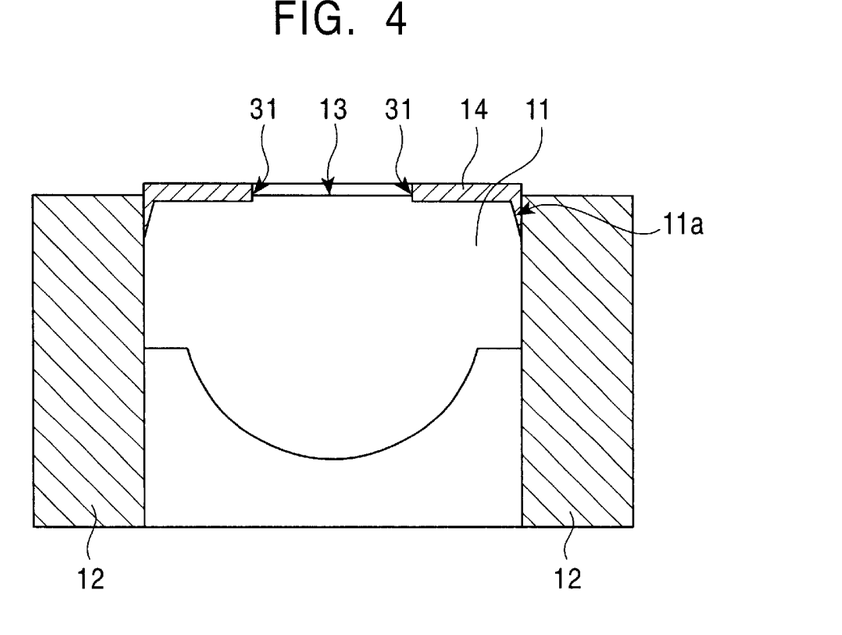

For other embodiments, it is possible to form a concave or convex shaped boundary part 21 outside the boundary of the effective-diameter area 13 of the optical-emitting surface of the objective lens, as shown in FIG. 3. Also, it is possible to make a level difference 31 on the boundary of the effective-diameter area 13, and construct it so that the leak of the resin layer into the effective-diameter area is prevented, as shown in FIG. 4. In other words, the crash pad or shock absorbing layer 14 has a thickness so as to come in contact with the surface of the recording medium prior to the effective-diameter area 13, when the objective lens comes close to the surface of the recording medium.

Figure 5:
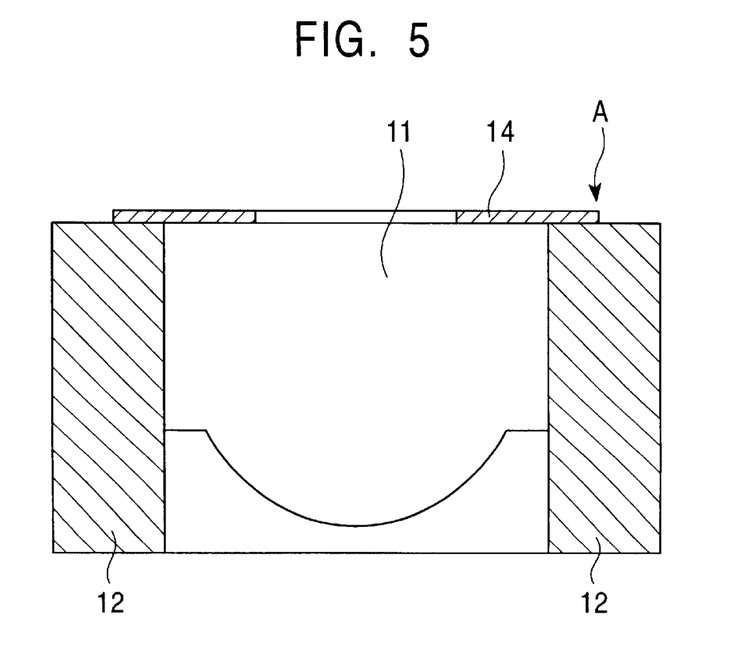
Figure 6:
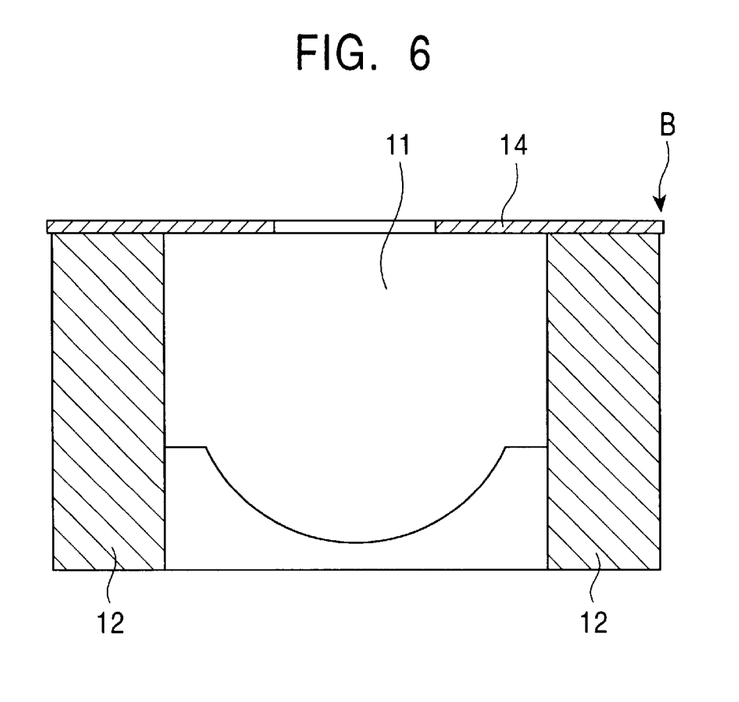

Furthermore, since the construction of an embodiment of this invention need not limit the diameter of the pad to extend only to the outer side of the objective lens, it is possible to have a pad 14 having a shape that extends to a portion "A" on top of the lens barrel 12 positioned outside, as shown in FIG. 5. In other words, shock absorbing layers with shapes extending to the outer side surface of the objective lens is included in this invention, instead of extending just to the outer edge or the outer side surface of the objective lens. Likewise, a shape extending to the outer side "B" of the lens barrel is included in this invention, as shown in FIG. 6. The advantage of such constructions of this invention is that the shock absorbing layer functions effectively, even when the lens barrel comes in contact with the disk. This is effective, especially in a condition in which the objective lens is at an angle to the disk, due to the warp of the disk. The shock absorbing layer is also effective, even when the lens barrel has a shape that protrudes more to the disk side than the objective lens.

Furthermore, since the shock absorbing layer is formed to be larger than the outer diameter of the objective lens, the formation of the shock absorbing layer and the adhesion of the objective lens can be done at the same time. Since a shock absorbing layer can be formed on top of the lens barrel, the shock absorbing layer functions effectively even in circumstances when the lens barrel collides with the disk.

In the above-mentioned examples, constructions that had the objective lens fixed only by the adhering effect of the shock absorbing layer have been described. However, there can be other construction examples when it is required to provide more strength in fixing, with methods like fitting the objective lens to the lens barrel, or strengthening the fixture by coating it with an additional adhesive, and so on.

Moreover, there are considerations given to pasting or coating the objective lens with the shock absorbing layer on a predetermined area thereof. With this method, it is necessary to coat the objective lens with the shock absorbing layer before the adhesion to the lens barrel, or coat it after the adhesion. Such coatings pose increase in man-hours for the adhesion. In the case of coating after the adhesion, the actuator springs supporting the lens barrel is apt to be deformed, because a force is applied to the objective lens when coating. The shock absorbing layer does not function effectively, when the lens barrel comes in contact with the disk. The present invention overcomes problems that the disk was apt to be damaged, and that it became extremely difficult to record and reproduce information to/from the disk in a stable state together with above mentioned drawbacks.

Figure 7:
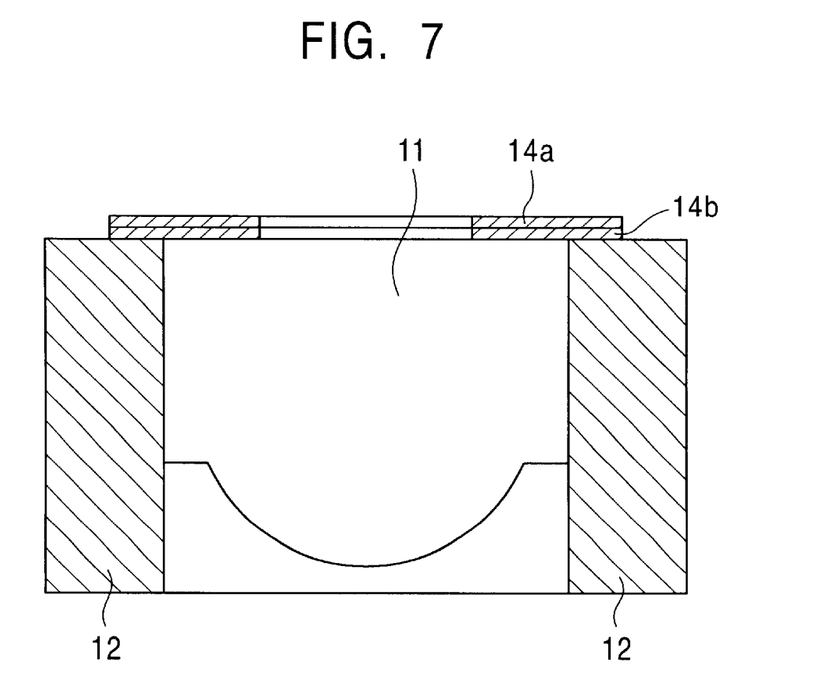

Furthermore, the shock absorbing layer is not limited to a single layer, and the shock absorbing layer can have a multiple layer construction, such as a two-layer construction of shock-absorbing-material layers 14a and 14b, shown in FIG. 7. In this case, a donut shaped sheet can be used for the upper shock-absorbing-material layer 14a of the shock absorbing layer, and an adhesive can be coated to this upper layer as the lower shock-absorbing-material layer 14b, to form a shock absorbing layer that extends over the objective lens 11 and the lens barrel 12. At the same time the lens barrel and the objective lens can be fixed. Moreover, it is possible to use UV curable resin for the upper shock-absorbing-material layer 14a, and constitute a shock absorbing layer by laminating it on top of the lower layer. By doing so, it is possible to employ a material harder than the disk for the lower shock-absorbing-material layer 14b. Hence it is possible to fix the objective lens more strongly, or form an upper shock-absorbing-material layer 14a softer than the other. In this case, the UV curable resin layer is formed as a laminated body including at least two shock-absorbing-material layers which have hardness numbers different from one another, in the film forming process of the above-mentioned UV curable resin layer. In the succeeding process, the portion of the UV curable resin layer corresponding to the effective-diameter area of the lens surface is removed.

Thus, according to the present invention, it is possible to use a soft material, which is the same type as the transparent cover layer of the outmost surface of the optical disk, for the crash pad of the objective lens with a collision preventing device. Hence there is no fear of damaging the surface of the cover layer. Moreover, it is possible to easily realize crash pads that are accurate in thickness with close dimensional tolerances, because crash pads can be formed based on the objective lens.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2001-31134 which is hereby incorporated by reference.

What is claimed is:

1. A collision preventing device used for an optical pickup device for recording or reproducing information to or from an optical information recording medium to prevent a contact of an objective lens and a surface of the recording medium, comprising:
 a shock absorbing layer laminated on a portion extending from a circumferential edge of an effective-diameter area of the objective lens toward an outside edge of said objective lens,
 wherein said shock absorbing layer includes a thickness such that, when said objective lens approaches to the surface of the recording medium, said shock absorbing layer comes in contact with the surface of the recording medium prior to said effective-diameter area.

2. A collision preventing device according to claim 1, wherein said shock absorbing layer comprises a UV curable resin.

3. A collision preventing device according to claim 1, wherein the lens barrel and said objective lens are adhered by said shock absorbing layer as an adhesive layer.

4. A collision preventing device according to claim 3, wherein said shock absorbing layer protrudes more toward the recording medium side than an edge face of the lens barrel.

5. The collision preventing device of claim 1, wherein said objective lens comprises a concave or convex shaped boundary part on an outside boundary of the effective-diameter area of the objective lens, and
 wherein said shock absorbing layer extends from the circumferential edge to said boundary part.

6. The collision preventing device of claim 1, wherein said objective lens comprises a level difference on a boundary of the effective-diameter area, and
 wherein said shock absorbing layer extends from the circumferential edge to said level difference on said boundary.

7. The collision preventing device of claim 1, further comprising:
 a lens barrel surrounding the objective lens.

8. The collision preventing device of claim 7, wherein said shock absorbing layer attaches to an inner lens barrel surface.

9. The collision preventing device of claim 1, wherein said shock absorbing layer extends from the circumferential edge to a perimeter of said lens.

10. A collision preventing device used for an optical pickup device for recording or reproducing information to or from an optical information recording medium to prevent a contact of an objective lens and a surface of the recording medium, comprising:
 a shock absorbing layer laminated on a portion extending from a circumferential edge of an effective-diameter area of the objective lens to an outside edge or outer side surface of said objective lens and having a thickness such that, when said objective lens approaches to the surface of the recording medium, said shock absorbing layer comes in contact with the surface of the recording medium prior to said effective-diameter area.
 wherein said shock absorbing layer comprises a laminated body including at least two shock-absorbing-material layers which have hardness numbers different from one another.

11. A method for manufacturing a collision preventing device used for an optical pickup device for recording or reproducing information to or from an optical information recording medium to prevent a contact of an objective lens and a surface of the recording medium, comprising:
 forming a UV curable resin layer uniformly with a predetermined thickness, fixed to the lens surface of said objective lens; and
 exposing the lens surface within an effective-diameter area of the lens surface by removing a part of said UV curable resin layer corresponding to said effective diameter part of the lens surface.

12. A method for manufacturing a collision preventing device according to claim 11, wherein the pickup device includes a lens barrel, the method further comprising adhering said objective lens and the lens barrel, using said UV curable resin layer as an adhesive layer.

13. A method for manufacturing a collision preventing device according to claim 6, wherein said exposing includes cutting and peeling off the part of said UV curable resin layer corresponding to said effective diameter part.

14. A method for manufacturing a collision preventing device according to claim 11, wherein said exposing includes removing the part of said UV curable resin layer corresponding to said effective diameter part by etching.

15. A method for manufacturing a collision preventing device according to claim 11, wherein said exposing includes pressing and cutting the part of said UV curable resin layer corresponding to said effective diameter part, using a metal mold corresponding to the effective-diameter area.

16. A method for manufacturing a collision preventing device according to claim 11, wherein said forming of the UV curable resin layer includes repeating to form at least two shock-absorbing-material layers as a laminated body which have hardness numbers different from one another.

17. An objective lens used for an optical pickup device for recording or reproducing information to or from an optical information recording medium to prevent a contact of an objective lens and a surface of the recording medium, comprising:
 an objective lens main body having an effective-diameter area; and
 a shock absorbing layer laminated on a portion extending from a circumferential edge of an effective-diameter area of the objective lens to an outside edge of said objective lens,
 wherein said shock absorbing layer includes a thickness that, when said objective lens approaches to the surface of the recording medium, said shock absorbing layer comes in contact with the surface of the recording medium prior to said effective-diameter area, and
 wherein said lens barrel surrounds said objective lens.

18. An objective lens according to claim 17, wherein said shock absorbing layer comprises a UV curable resin.

19. An objective lens according to claim 17, wherein the pickup device includes a lens barrel, and the lens barrel and said objective lens are adhered by said shock absorbing layer as an adhesive layer.

20. An objective lens according to claim 19, wherein said shock absorbing layer protrudes more toward the recording medium side than an edge face of the lens barrel.

21. The collision preventing device of claim 17, wherein said objective lens comprises a concave or convex shaped boundary part on an outside boundary of the effective-diameter area of the objective lens, and wherein said shock absorbing layer extends from the circumferential edge to the boundary part.

22. The collision preventing device of claim 17, wherein said objective lens comprises a level difference on a boundary of the effective-diameter area, and wherein said shock absorbing layer extends from the circumferential edge to the level difference on said boundary.

23. The collision preventing device of claim 17, further comprising:

a lens barrel surrounding the objective lens.

24. The collision preventing device of claim 23, wherein said shock absorbing layer attaches to an inner lens barrel surface.

25. The collision preventing device of claim 17, wherein said shock absorbing layer extends from the circumferential edge to a perimeter of said lens.

26. The collision preventing device of claim 17, wherein the shock absorbing layer is formed as a substantially planar layer at an approximate uniform height from the surface of said objective lens.

27. An objective lens used for an optical pickup device for recording or reproducing information to or from an optical information recording medium to prevent a contact of an objective lens and a surface of the recording medium, comprising:

an objective lens main body having an effective-diameter area; and a shock absorbing layer laminated on a portion extending from a circumferential edge of said effective-diameter area to an outside edge or outer side surface of said objective lens and having a thickness such that, when said objective lens comes close to the surface of the recording medium, said shock absorbing layer comes in contact with the surface of the recording medium prior to said effective-diameter area, wherein said shock absorbing layer comprises a laminated body including at least two shock-absorbing-material layers which have hardness numbers different from one another.

28. A collision preventing device used for an optical pickup device for recording or reproducing information to or from an optical information recording medium to prevent a contact of an objective lens and a surface of the recording medium, comprising:

a shock absorbing layer laminated on a portion extending from a circumferential edge of an effective-diameter area of the objective lens toward an outside edge of said objective lens, wherein said shock absorbing layer includes a thickness such that, when said objective lens approaches to the surface of the recording medium, said shock absorbing layer comes in contact with the surface of the recording medium prior to said effective-diameter area, and wherein the shock absorbing layer is formed as a substantially planar layer at an approximately uniform height from the surface of said objective lens.

29. An objective lens system used for an optical pickup device for recording or reproducing information to or from an optical information recording medium to prevent a contact of an objective lens and a surface of the recording medium, comprising:

an objective lens main body having an effective-diameter area;

a lens barrel surrounding the objective lens; and a shock absorbing layer laminated on a portion extending from an outer side surface of said objective lens to an inner wall of said lens barrel, wherein said shock absorbing layer includes a thickness such that, when said objective lens approaches to the surface of the recording medium, said shock absorbing layer comes in contact with the surface of the recording medium prior to said effective-diameter area, and wherein the shock absorbing layer is formed as a substantially planar layer at an approximate uniform height from the surface of said objective lens.

* * * * *